United States Patent Office 2,768,090
Patented Oct. 23, 1956

2,768,090

POLYAMIDE RESIN SUSPENSOIDS WITH REVERSED CHARGES

Harold Wittcoff and Malcolm M. Renfrew, Minneapolis, Minn., assignors to General Mills, Inc., a corporation of Delaware No Drawing. Application April 9, 1951,
Serial No. 220,138

6 Claims. (Cl. 106—287)

The present invention relates to new compositions of matter comprising polyamide resin suspensoids which initially are cationic, but which have had the charge reversed to produce essentially anionic suspensoids. The invention also relates to a process of producing polyamide resin suspensoids with such a reversed charge. In the application of Harold Wittcoff and Wesley A. Jordan, Serial No. 141,262, filed January 30, 1950, and now abandoned, for Polyamide Suspensoid, there are described polyamide resin suspensoids derived from polyamide resins having amine numbers in excess of 1. These suspensoids are produced by dispersing melted polyamide resins in an aqueous solution of an acid. The suspensoid produced is cationically stabilized by an intrinsic emulsifying agent which comprises a salt prepared from any free or excess amino groups present in the polymer and any one of a variety of acids, including acetic acid. These suspensoids are compatible with a great variety of other water dispersed materials and the resultant mixture has great stability when the water dispersions of the added materials are cationically or non-ionically dispersed. When, on the other hand, the water dispersions of the other materials are anionically stabilized, combinations of these materials with cationic stabilized polyamide resin suspensoids demonstrate only limited stability.

For many uses this limited stability is adequate and further modifications need not be made. For other uses, on the other hand, such as the preparation of paints from pigmented mixtures of the polyamide resin suspensiod and latices, greater stability is required than can be obtained by the mixture of the cationically dispersed polyamide resin and the anionically dispersed other material. It has now been discovered that the cationic charge of the polyamide resin suspensoid may be reversed so that the polyamide resin suspensoid becomes for all practical purposes anionic and hence compatible with virtually any anionically stabilized latex emulsion or dispersion. This is accomplished by treatment of the cationic polyamide resin suspensoid with an excess of an anionic emulsifier.

It is therefore an object of the present invention to provide novel polyamide suspensoid compositions prepared from cationically dispersed suspensoids derived from polyamides having an amine number in excess of 1, and in which the cationic charge has been reversed to an anionic charge by means of an excess of an anionic emulsifier.

It is another object of the present invention to provide a novel process of producing polyamide resin suspensoids of reversed charge.

The polyamides to which the present invention relates are those derived from polymeric higher fatty acids. Polyamides of this type are disclosed in Cowan et al., Patent 2,450,940, and in general, the polyamides disclosed in that patent are useful in the present invention. These polyamides are derived from polymeric fatty acids such as the polymerized fatty acids resulting from the polymerization of drying or semi-drying oils, or the free acids, or simple aliphatic alcohol esters thereof. Suitable drying or semi-drying oils include soybean, linseed, tung, perilla, oiticica, cottonseed, corn, tall, sunflower, safflower, dehydrated castor oil, and the like. In the polymerization process for the preparation of the polymeric fatty acids, the fatty acids with sufficient double bond functionality combine, for the most part, probably by a Diels-Alder mechanism, to provide a mixture of dibasic and higher polymeric acids. The acids with insufficient functionality to react remain as monomers and may be removed by distillation. The residue after distillation consists of the desired polymeric acids and this mixture is used for the preparation of polyamide resin. In place of this method of polymerization, any other method of polymerization may be employed, whether the resultant polymer possesses residual unsaturation or not. The polymeric fat acids either by themselves or in admixture with other polybasic acids, particularly aliphatic and aromatic polybasic acids containing from 5 to 10 carbon atoms and in which the carboxyl groups are separated by at least 3 carbon atoms, such as glutaric, adipic, azelaic, sebacic, and terephthalic acids, are converted to polyamides by reaction with a suitable polyfunctional amine, preferably aliphatic polyamines such as ethylene diamine, dietylene triamine, and the like. Ordinarily polyamides of this type have molecular weights varying from 3,000 to 10,000 and are resistant to the corrosive action of water, alkali, acids, oils, greases, and organic solvents. In instances where the resins contain free or excess amine, as is hereinafter described, the molecular weight may be as low as 1,000. The resins derived from ethylene diamine and polymeric fat acids alone have melting points in the range of 105–120° C. Those derived from polymeric fat acids and other polybasic acids melt at higher temperatures, frequently as high as 210° C. These copolymer resins are very hard and have improved tensile strength.

Resins of this nature have found wide usage in industry, particularly as hot melt adhesives and as paper coatings, where they demonstrate good moisture vapor resistance and grease resistance. They serve also as laminating agents for a variety of materials including foil, paper, plastics and cork, as electrical insulators, and as shellac substitutes for wood sealing. They have found further application as temporary or permanent protective coatings, particularly in instances where application by hot dipping is feasible. By and large, however, the most important application has involved use as hot melt adhesives where numerous desirable properties have been demonstrated, including low heat sealing temperature and excellent bonding properties.

The polyamide suspensoids may be prepared by the dispersion in an aqueous medium of polyamides derived from polymeric fat acids and having an amine number of at least 1, and preferably an amine number of from 5 to 90. The term "amine number" is defined as the milligrams of potassium hydroxide equivalent to the free or excess amine groups present in one gram of the resin. The term "free amine groups" is intended to cover the unreacted amine groups present in the resin as a result of incomplete amidification; whereas the term "excess amine groups" is intended to cover amine groups which are present in the resin from the incorporation into the reaction mixture used for producing the resin a quantity of polyamine in excess of that stoichiometrically required.

These polyamides are melted and then dispersed in water containing a small amount of acid. The mixture is heated and stirred and as a result dispersion of the polyamide occurs. For the preparation of the suspensoid a wide variety of acidic materials may be employed, including formic, acetic, propionic, butyric, monochloracetic, hydrochloric, phosphoric, fumaric, lactic, maleic, oxalic, tartaric, benzoic, succinic, terephthalic, furoic, and gallic acids. The amount of acid employed is not critical. The employment of a small quantity of acid will result in some dispersion of the polyamide and the amount of dispersion obtained will increase with the amount of acid until a certain maximum beyond which further addition of acid does not increase the total amount of polyamide dispersed. The quantity of acid employed is not necessarily enough to neutralize all of the amine groups, and indeed in some instances it is found highly desirable not to neutralize all the amine groups. In the case of polyamides of very low amine numbers, such as those with amine numbers of 1 to 5, the amount of acid which is added may be enough to completely neutralize the amine number. In the case of polyamides having higher amine numbers, adequate dispersion may be obtained with far less acid than is necessary for complete neutralization of the polyamide. It is, of course, possible to add excess acid, in which case the polyamide dispersion would be on the acid side. It is apparent, therefore, that it is possible to produce dispersions which are either alkaline, neutral, or acid.

A wide variety of non-dispersible resins, plasticizers, and other compounding ingredients may be employed for compounding the polyamides. Among the compounding ingredients and resins which may be used in combination with the polyamide resin to obtain stable compositions according to the present invention may be included rosin esters of all types of monohydric and polyhydric alcohols, the esters being either partial or complete, phenolformaldehyde resins, urea formaldehyde resins, maleic resins, vinyl polymers, waxes, a wide variety of plasticizers including hydrocarbons, chlorinated hydrocarbons, polyethylene glycols, many types of esters, alkyd type plasticizers, and the like.

The anionic emulsifiers which may be used are manifold. Excellent results are obtained from sodium alkylaryl sulfonates such as the product marketed as Nacconol NRSF. Other anionically active materials which may be used include fatty acid salts of tertiary amines, sulfonated oils, alkyl esters of sulfonated polycarboxylic acids, sodium alkylnaphthalene, sulfonates, sulfated hydroxyfatty acid esters, sulfated fatty amines and amides, sulfated glycol ester of fatty acids, aminoalkylaryl sulfonates, sulfated mon- and diglycerides of fatty acids, and in general, any anionic emulsifying agent. Typical examples of such anionic emulsifiers are as follows: dioctyl ester of sodium sulfosuccinate, sodium isobutylnaphthalenesulfonate, sulfated castor oil, sulfated oleyl amine, aminoalkylbenzenesulfonate, and sodium oleyl methyltaurate.

The procedure to be followed in reversing the charge of a suspensoid involves primarily the treatment of the cationic polyamide resin suspensoid with an excess of anionic emulsifier which may or may not be in aqueous solution. The addition of the anionic emulsifier must be accomplished rapidly and preferably with vigorous agitation. By the term "excess" as used herein, is meant a quantity of anionic emulsifier greater than is necessary to neutralize stoichiometrically the amount of acid used to form an amine salt in the original cationic dispersion. Although there is no limit to the excess which may be used, it is preferred to operate with an excess in the region of 1 to 10 fold.

The reversal of the charge may be carried out with cationically dispersed polyamide resin suspensoids regardless of the solids content of the suspensoid. The resulting products are extremely stable as measured by a reliable stability test, the details of which are described in the examples. The reversed charge products have excellent adhesive properties just as do the cationic dispersions themselves. Likewise they have excellent non-blocking properties when spread as films, and these films when fused demonstrate excellent grease proofness and water vapor resistance. In other words, the reversal of the charge does not in any way impair the properties of the polyamide whereas it greatly expands the utility of the suspensoid. This is demonstrated by the fact that the suspensoid whose charge has been reversed with an anionic emulsifier is compatible with natural rubber latex, synthetic anionic latices, and polymer dispersions, dispersions of clay which contain anionic emulsifiers, protein dispersions which are basic, and in general, with virtually any emulsion which is stabilized with an anionic emulsifying agent.

Of particular interest are combinations with latices which form the base for the preparation of various types of protective coatings. The presence of polyamide resin suspensoid imparts a desired flat finish to the coating and at the same time enhances its water and water vapor resistance.

*Example 1*

A mixture of 35 pounds of dimerized soybean oil fatty acids (monomer 10%, dimer 69.5%, trimer 20.5%, acid number 186.5, sap. eq. 291.1), 318 g. of oleic acid, and 2525 g. of 67.5% aqueous ethylene diamine was placed in a kettle and the temperature was raised under total reflux to 120° C. Thereafter the water of reaction as well as the water present in the ethylene diamine solution was removed by distillation, and the pot temperature raised slowly to 200° C. The temperature was maintained at 200° C. for 3 hours and during the last hour a vacuum of 24 inches was employed. At no time during the reaction was the vapor temperature allowed to exceed 100° C. The vacuum was broken with nitrogen at the end of the reaction and the product was cooled to 150° C., and had the following properties after solidification:

Amine number _____ 11.0
Acid number _____ 5.8
Melting point (ball and ring)_____° C__ 107
Gel time at 200° C_____seconds__ 800

To 100 parts of molten polyamide resin with an amine number of 11 was added with vigorous stirring 185 parts of water heated to 95° C. and 1.4 parts of glacial acetic acid. Dispersion occurred immediately, and on continued stirring and cooling a smooth white suspensoid resulted.

To 100 parts of polyamide resin suspensoid containing 35% solids was added a solution of 5.0 grams of a sodium alkylaryl sulfonate (Nacconol NRSF) dissolved in 15 parts of water. The addition was accomplished with vigorous stirring. The resulting product was a material which was for all practical purposes an anionic suspensoid. The reversal of charge could be accomplished with virtually any of the anionic emulsifiers listed above.

In this particular example a five-fold excess of the anionic reagent was employed. The same results were obtained when polyamide resin suspensoid with a solids content of 50% was employed.

The stability of these suspensoids was determined by a test which involves centrifuging 100 g. for thirty minutes at 2000 R. P. M. at room temperature. The weight of the materials which have been precipitated was then determined. A blank was also tested in order to compensate for the quantity of materials adhering to the walls of the centrifuge bottle. The suspensoid possesses excellent stability if 1 to 5 grams of precipitate per 100 grams of suspensoid are obtained in this test. The samples described above yielded 0.70 and 0.90 gram of precipitate per 100 grams of suspensoid in this test. Thus it appears that the stability of the products with reversed charges is excellent.

*Example 2*

To 300 parts of the polyamide resin suspensoid prepared as described in Example 1 was added quickly with vigorous stirring a solution comprising 21 parts of sodium lauryl sulfate (Dupanol C) and 60 parts of water at room temperature. After the addition was completed the mixture was stirred vigorously for 15 minutes. The product with reversed charge obtained in this manner had a stability factor of 0.9, the stability factor having been determined by the test described in Example 1. This reversed charge material was entirely compatible with natural rubber latex and with anionic synthetic elastomeric latices such as those which have been stabilized by the addition of soaps. The product did not demonstrate thickening on storage.

*Example 3*

To 100 parts of polyamide resin suspensoid containing 35% solids and prepared as described in Example 1 was added a solution of 7 parts of mixed sodium higher fatty alcohol sulfates (Aquarex D) in 20 parts of water. Again the addition was accomplished with rapid stirring and the stirring was continued for 15 minutes after the addition had taken place. This material likewise was compatible with a wide variety of anionic latices, emulsions, and dispersions.

*Example 4*

The products described in Example 1 are compatible in all proportions with natural rubber latex, synthetic anionic latices such as Dow Latex 512K and with a commerical rosin-like anionic emulsion known as Vinsol Emulsion. Each of these materials was mixed with the suspensoids of Example 1 and a stable mixed suspensoid was prepared by simple mixing.

*Example 5*

A sulfonamide type resin known as Santolite MHP was emulsified by dissolving it in 95% ethyl alcohol and adding a small quantity of triethanolamine oleate. This solution was then stirred into water to obtain an emulsion which was entirely compatible with the suspensoid described in Example 1.

*Example 6*

A dimerized acid from vegetable oil was prepared and had the following properties:

| | |
|---|---|
| Monomer _____ percent__ | 10 |
| Dimer _____ do____ | 69.5 |
| Trimer _____ do____ | 20.5 |
| Sap. eq_____ | 291.1 |

A mixture of this dimeric acid (437 parts), cottonseed acids (17.5 parts) and sebacic acid (48.0 parts) was heated to 130° C. and ethylene diamine (94.2 parts, 67.5%) was added at a rate such that the temperature of the distillate did not exceed 99° C. After the completion of the addition, the temperature of the reaction mixture was raised to 200° C., again at a rate such that the temperature of the distillate did not exceed 200° C. The reaction mixture was maintained at 200° C. for three hours and during the last hour vacuum was applied. The product had the following properties:

| | |
|---|---|
| Ball and ring melting point_____° C__ | 182 |
| Acid number_____ | 5.9 |
| Penetration hardness_____ | 2.8 |
| Color (Gardner, 35% solution in butanol toluene, 1:1) _____ | 11 |
| Gel time at 200° C_____min__ | 19–21 |

A mixture of 30 parts of the copolymer resin described above and 70 parts of polyamide resin prepared from polymeric fat acids as described in Example 1, was fused by heating to 200° C. The mixture melted at 170° C. To the molten mixture was added, with very vigorous stirring, 153 parts of water containing 1.5 parts of glacial acetic acid. The water and acetic acid mixture was heated practically to 100° C. and the addition was accomplished rapidly. On cooling a suspensoid of medium viscosity resulted having a solids content of 35%.

To 50 parts of the above described suspensoid were added quickly and with vigorous stirring 2½ parts sodium alkylaryl sulfonate (Nacconal NRSF) dissolved in 1.5 parts of water. The resulting product was a material which for all practical purposes was an anionic suspensoid. This was indicated by the fact that it was entirely compatible in all proportions with an anionic latex prepared from butadiene and styrene.

We claim as our invention:

1. Process of producing an anionically dispersed suspensoid in an aqueous medium of a polyamide having the polyacyl group of polymeric fatty acids and the polyamino group of an aliphatic polyamine, the polyamide having a molecular weight within the approximate range of 1,000 to 10,000, said polyamide having an amine number of at least 1, which comprises first dispersing said polyamide cationically in an aqueous medium by means of sufficient acid to react with free amine groups in the polyamide to form intrinsic amine salt groups which effect a cationic suspensoid of the polyamide, and then converting said cationic suspensoid to an anionic suspensoid by adding thereto a quantity of anionic emulsifier greater than is necessary to neutralize stoichiometrically the amount of acid used to form an amine salt in the original cationic dispersion.

2. Process of producing an anionically dispersed suspensoid in an aqueous medium of a polyamide having the polyacyl group of polymeric fatty acids and the polyamino group of an aliphatic polyamine, the polyamide having a molecular weight within the approximate range of 1,000 to 10,000, said polyamide having an amine number of at least 10, which comprises first dispersing said polyamide cationically in an aqueous medium by means of sufficient acid to react with free amine groups in the polyamide to form intrinsic amine salt groups which effect a cationic suspensoid of the polyamide, and then converting said cationic suspensoid to an anionic suspensoid by adding thereto a quantity of anionic emulsifier greater than is necessary to neutralize stoichiometrically the amount of acid used to form an amine salt in the original cationic dispersion.

3. Process of producing an anionically dispersed suspensoid in an aqueous medium of a polyamide having the polyacyl group of polymeric fatty acids and the diamino group of an aliphatic diamine, the polyamide having a molecular weight within the approximate range of 1,000 to 10,000, said polyamide having an amine number of at least 10, which comprises first dispersing said polyamide cationically in an aqueous medium by means of sufficient acid to react with free amine groups in the polyamide to form intrinsic amine salt groups which effect a cationic suspensoid of the polyamide, and then converting said cationic suspensoid to an anionic suspensoid by adding thereto a quantity of anionic emulsifier greater than is necessary to neutralize stoichiometrically the amount of acid used to form an amine salt in the original cationic dispersion.

4. Process of producing an anionically dispersed suspensoid in an aqueous medium of a polyamide having the diacyl group of dimeric fatty acids and the diamino group of an aliphatic diamine, the polyamide having a molecular weight within the approximate range of 1,000 to 10,000, said polyamide having an amine number of at least 10, which comprises first dispersing said polyamide cationically in an aqueous medium by means of sufficient acid to react with free amine groups in the polyamide to form intrinsic amine salt groups which effect a cationic suspensoid of the polyamide, and then converting said cationic suspensoid to an anionic suspensoid by adding thereto a quantity of anionic emulsifier greater than is necessary to neutralize stoichiometrically the amount of acid used to form an amine salt in the original cationic dispersion.

5. Process of producing an anionically dispersed suspensoid in an aqueous medium of a polyamide having the diacyl group of dimeric fatty acids and the diamino group of an aliphatic diamine, the polyamide having a molecular weight within the approximate range of 1,000 to 10,000 said polyamide having an amine number of at least 10, which comprises first dispersing said polyamide cationically in an aqueous medium by means of sufficient acid to react with free amine groups in the polyamide to form intrinsic amine salt groups which effect a cationic suspensoid of the polyamide, and then converting said cationic suspensoid to an anionic suspensoid by adding thereto a quantity of sodium alkyl aryl sulfonate greater than is necessary to neutralize stoichiometrically the amount of acid used to form an amine salt in the original cationic dispersion.

6. Process of producing an anionically dispersed suspensoid in an aqueous medium of a polyamide having the diacyl group of dimeric fatty acids and the diamino group of an aliphatic diamine, the polyamide having a molecular weight within the approximate range of 1,000 to 10,000, said polyamide having an amine number of at least 10, which comprises first dispersing said polyamide cationically in an aqueous medium by means of sufficient acid to react with free amine groups in the polyamide to form intrinsic amine salt groups which effect a cationic suspensoid of the polyamide, and then converting said cationic suspensoid to an anionic suspensoid by adding thereto a quantity of sodium fatty alcohol sulfate greater than is necessary to neutralize stoichiometrically the amount of acid used to form an amine salt in the original cationic dispersion.

References Cited in the file of this patent

UNITED STATES PATENTS

| Number | Name | Date |
|---|---|---|
| 1,910,547 | James et al. | Mar. 23, 1933 |
| 2,138,226 | Dales et al. | Nov. 29, 1938 |
| 2,143,986 | Kling et al. | Jan. 17, 1939 |
| 2,335,930 | Freeland | Dec. 7, 1943 |
| 2,342,387 | Catlin | Feb. 22, 1944 |
| 2,450,940 | Cowan et al. | Oct. 5, 1948 |
| 2,630,397 | Cowan et al. | Mar. 3, 1953 |

OTHER REFERENCES

"Oil and Soap J." of April 1944, pages 101–107.

"Progress thru research," vol. 5, No. 1, fall 1940, pages 1–4.

"Polyamide Resin Suspensoids," Revision D, October 20, 1950, page 6.